(12) United States Patent
Carberry et al.

(10) Patent No.: US 10,399,199 B2
(45) Date of Patent: Sep. 3, 2019

(54) INSPECTION OF DRILLED FEATURES IN OBJECTS

(71) Applicant: BAE Systems plc, London (GB)

(72) Inventors: Jonathan Michael Carberry, Lancashire (GB); Austin James Cook, Lancashire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/569,947

(22) PCT Filed: Apr. 28, 2016

(86) PCT No.: PCT/GB2016/051213
§ 371 (c)(1),
(2) Date: Oct. 27, 2017

(87) PCT Pub. No.: WO2016/174444
PCT Pub. Date: Nov. 3, 2016

(65) Prior Publication Data
US 2018/0154491 A1    Jun. 7, 2018

(30) Foreign Application Priority Data

Apr. 30, 2015  (EP) .................................... 15275127
Apr. 30, 2015  (GB) ................................... 1507453.7

(51) Int. Cl.
*B23Q 17/24*    (2006.01)
*B21J 15/14*    (2006.01)
(Continued)

(52) U.S. Cl.
CPC ........ *B23Q 17/2471* (2013.01); *B21J 15/142* (2013.01); *B21J 15/28* (2013.01);
(Continued)

(58) Field of Classification Search
CPC .. B21J 15/02; B21J 15/14; B21J 15/28; Y10S 901/47; Y10S 901/05; Y10S 901/41;
(Continued)

(56) References Cited

U.S. PATENT DOCUMENTS 6,154,279 A * 11/2000 Thayer ................... G01B 11/22
356/602
8,841,603 B1 * 9/2014 Blanton ............. G01B 11/2518
250/256

(Continued)

FOREIGN PATENT DOCUMENTS

EP      2738516 A2    6/2014
EP      2772724 A1    9/2014
WO      2013053350 A1  4/2013

OTHER PUBLICATIONS

International Search Report and Written Opinion of International Application PCT/GB2016/051213, dated Jul. 13, 2016, 10 pages.
(Continued)

*Primary Examiner* — Isiaka O Akanbi
(74) *Attorney, Agent, or Firm* — Maine Cernota & Rardin

(57) ABSTRACT

Disclosed is a method and apparatus for determining a depth of a feature (4) formed in an object (2), the feature (4) having been formed in the object (2) by a cutting tool (38). The apparatus comprises: a camera (42) configured to capture an image of the feature (4) and a portion of the object (2) proximate to the feature (4); and one or more processors operatively coupled to the camera (42) and configured to: detect, in the image, an edge (72) of the feature (4) between the feature (4) and a surface of the object (2); using the detected edge (72), calculate a diameter for a circle (74, 76, 78); acquire a point angle of the cutting tool (38); and, using the calculated diameter and the acquired point angle, calculate a depth value for the feature (4).

9 Claims, 7 Drawing Sheets

(51) Int. Cl.

| | |
|---|---|
| *B21J 15/28* | (2006.01) |
| *G01B 11/12* | (2006.01) |
| *G01B 11/22* | (2006.01) |
| *B25J 3/04* | (2006.01) |
| *B25J 9/16* | (2006.01) |
| *B25J 11/00* | (2006.01) |
| *B25J 15/00* | (2006.01) |
| *B25J 19/02* | (2006.01) |

(52) U.S. Cl.
CPC ............ *B23Q 17/2466* (2013.01); *B25J 3/04* (2013.01); *B25J 9/1682* (2013.01); *B25J 11/0055* (2013.01); *B25J 15/0019* (2013.01); *B25J 19/022* (2013.01); *B25J 19/023* (2013.01); *G01B 11/12* (2013.01); *G01B 11/22* (2013.01); *Y10S 901/05* (2013.01); *Y10S 901/41* (2013.01); *Y10S 901/47* (2013.01)

(58) Field of Classification Search
CPC ....... B23Q 17/2471; B25J 19/022; B25J 3/04; B25J 9/1682; B25J 11/0055; B25J 15/0019; B25J 19/023; G01B 11/12; G01B 11/22
USPC .................................................. 365/601–626
See application file for complete search history.

(56) References Cited

U.S. PATENT DOCUMENTS

| | | | | |
|---|---|---|---|---|
| 2008/0144045 | A1* | 6/2008 | Bennison | G01B 21/20 356/614 |
| 2008/0304085 | A1* | 12/2008 | Mead | G01B 11/14 356/626 |
| 2010/0195116 | A1* | 8/2010 | Monks | G01B 11/25 356/604 |
| 2012/0328381 | A1 | 12/2012 | Schmidt et al. | |
| 2014/0226156 | A1 | 8/2014 | Bergman et al. | |
| 2014/0253913 | A1* | 9/2014 | Bergman | G01N 21/954 356/241.1 |
| 2014/0325810 | A1* | 11/2014 | Schneider | B21J 15/02 29/407.04 |

OTHER PUBLICATIONS

Search Report under Section 17(5) of Great Britain Application No. GB1507453.7, dated Sep. 17, 2015, 3 pages.
European Search Report of European Application No. EP15275127.7, dated Nov. 2, 2015, 5 pages.
International Preliminary Report on Patentability of International Application No. PCT/GB2016/051213, dated Oct. 31, 2017, 7 pages.
http://www.kuka-robotics.com/en/products/industrial_robots/heavy/kr360_fortec/kr360_r2830/print/start.htm.

* cited by examiner

INSPECTION OF DRILLED FEATURES IN OBJECTS

RELATED APPLICATIONS

This application is a national phase application filed under 35 USC § 371 of PCT Application No. PCT/GB2016/051213 with an International filing date of Apr. 28, 2016 which claims priority of GB Patent Application 1507453.7 filed Apr. 30, 2015 and EP Patent Application 15275127.7 filed Apr. 30, 2015. Each of these applications is herein incorporated by reference in its entirety for all purposes.

FIELD OF THE INVENTION

The present invention relates to inspecting features drilled or cut into objects.

BACKGROUND

In the field of aircraft construction, it tends to be desirable to countersink predrilled holes in panels that are to be fastened to a structure to provide an airframe. This is performed so that the fastener used to fasten the panel to the structure may be flush with a surface of the panel (e.g. the outer surface of the aircraft). This tends to provide that the resulting airframe has better aerodynamic properties compared to if the fastener was not flush with the outer surface of the aircraft.

Countersinking of predrilled holes may be performed manually by human operators, e.g. using hand tools and workbenches. During the countersinking process, the panels may bend or deflect on the workbench due to the forces applied by the operator. The operator may manually compensate for such deflection. The operator may also compensate for curvature in the part being countersunk e.g. by manually adjusting the settings on the hand tool. However, large workforces and workspaces tend to be required for processing a large number of panels. Also, the human operators may develop repetitive strain injury caused by repeated drilling.

Countersinking of holes may also be performed using a machine tool (or robot). The use of such devices typically requires use a secure fixture that rigidly supports a panel so as to prevent it deflecting under the cutting/drilling forces. Such machine tools can be very expensive. The fixtures, which are usually required to be bespoke for the shape of panel being drilled, also tend to be expensive.

SUMMARY OF THE INVENTION

In a first aspect, the present invention provides apparatus for determining a depth of a feature formed in an object, the feature having been formed in the object by a cutting tool. The apparatus comprises: a camera configured to capture an image of the feature and a portion of the object proximate to the feature; and one or more processors operatively coupled to the camera and configured to: detect, in the image, an edge of the feature between the feature and a surface of the object; using the detected edge, calculate a diameter for a circle; acquire a point angle of the cutting tool; and, using the calculated diameter and the acquired point angle, calculate a depth value for the feature.

The feature may be a countersink of a hole through a portion of the object.

The one or more processors may be further configured to: compare the calculated depth value to a predefined range of depth values; and, if the calculated depth value is within the predefined range of depth values, assign a first label to the feature; or, if the calculated depth value is not within the predefined range of depth values, assign a second label to the feature, the second label being different to the first label.

The circle may be a circle that best fits to the detected edge.

The one or more processors may be further configured to: determine that a portion of the object proximate to the feature has curvature substantially equal to zero; and, responsive to determining that a portion of the object proximate to the feature has curvature substantially equal to zero, using the diameter of the best fit circle and the acquired point angle, calculate the depth value for the feature.

A shape of the detected edge in the image may be substantially an ellipse. The diameter for the circle may be equal to the minor axis of the ellipse.

The one or more processors may be further configured to: determine that a portion of the object proximate to the feature is concave relative to the camera; and, responsive to determining that a portion of the object proximate to the feature is concave relative to the camera, using the diameter of the circle and the acquired point angle, calculate the depth value for the feature.

A shape of detected edge in the image may be substantially an ellipse. The diameter for the circle may be equal to the major axis of the ellipse.

The one or more processors may be further configured to: determine that a portion of the object proximate to the feature is convex relative to the camera; and, responsive to determining that a portion of the object proximate to the feature is convex relative to the camera, using the diameter of the circle and the acquired point angle, calculate the depth value for the feature.

The one or more processors may be configured to, using the calculated diameter, the acquired point angle, and one or more trigonometric functions, calculate the depth value for the feature.

The apparatus may further comprise a lighting system configured to emit electromagnetic radiation. The camera may be configured to detect the electromagnetic radiation emitted by the lighting system. The lighting system may be configured to emit electromagnetic radiation onto the feature and the portion of the object proximate to the feature, thereby increasing contrast in the image between the feature and the surface of the object.

The camera may be located on an end effector of a robot arm.

The apparatus may further comprise the cutting tool. The camera may be further configured to capture one or more images of the object prior to the feature being formed in the object. The one or more processors may be further configured to: using the one or more images of the object prior to the feature being formed in the object, move the cutting to be normal to a surface of the object; and, thereafter, control the cutting tool to form the feature in the object.

In a further aspect, the present invention provides a method of determining a depth of a feature formed in an object, the feature having been formed in the object by a cutting tool. The method comprises: capturing an image of the feature and a portion of the object proximate to the feature; detecting, in the image, an edge of the feature between the feature and a surface of the object; using the detected edge, calculating a diameter for a circle; acquiring a point angle of the cutting tool; and, using the calculated diameter and the acquired point angle, calculating a depth value for the feature.

In a further aspect, the present invention provides an aircraft panel comprising one or more holes, each hole comprising a countersunk portion, each countersunk portion being associated with a depth value, each depth value having been determined according to the preceding aspect.

DETAILED DESCRIPTION

Figure 1:
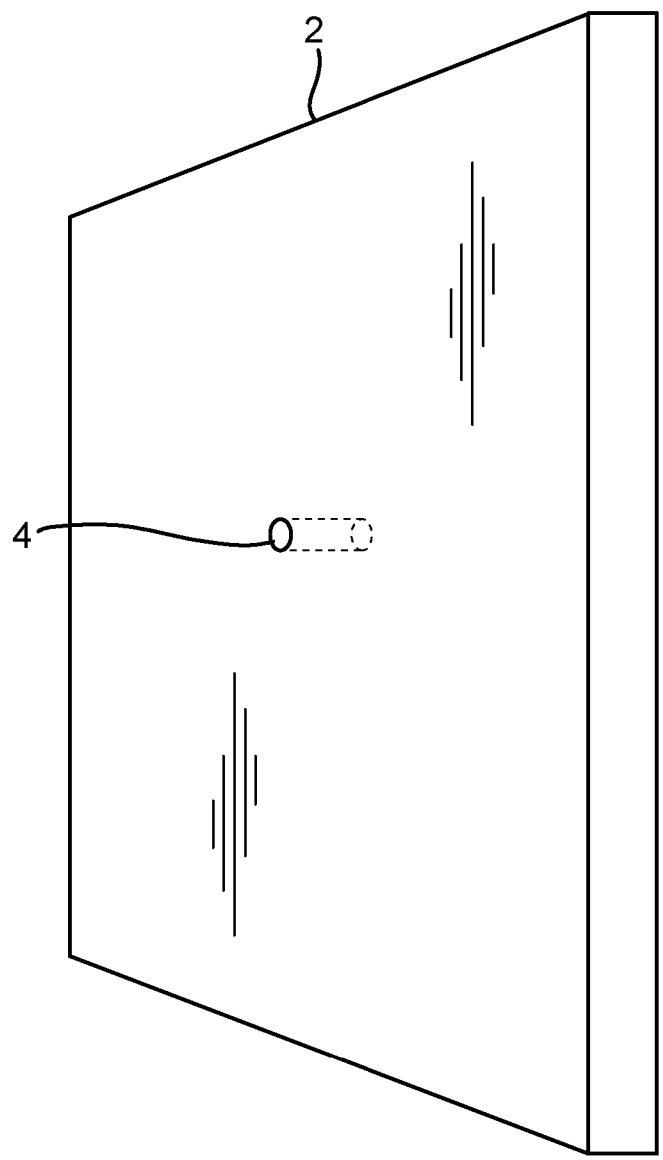
FIG. 1 is a schematic illustration (not to scale) of an example aircraft panel.

FIG. 1 is a schematic illustration (not to scale) of an example panel 2.

The panel 2 is made of carbon fibre. The panel 2 comprises a pre-drilled hole 4 through the panel 2 from a front surface of the panel 2 to a rear surface of the panel 2. In other words, the hole 4 is a passage through the structure of the panel 4.

The hole 4 is of known diameter. The direction of the hole 4 through the panel 2 is normal (i.e. perpendicular) to the front surface of the panel 2.

In this embodiment, the panel 2 is to be fixed to a structure to form part of an airframe of an aircraft. The panel is to be fixed to the structure by a fastener that passes through the hole 4 (from the front surface to the rear surface) and into the structure. The hole 4 is to be countersunk (to a pre-determined depth) at the front surface so that the fastener is flush with the front surface. This tends to provide that the resulting aircraft is relatively aerodynamic and stealthy.

Figure 2:
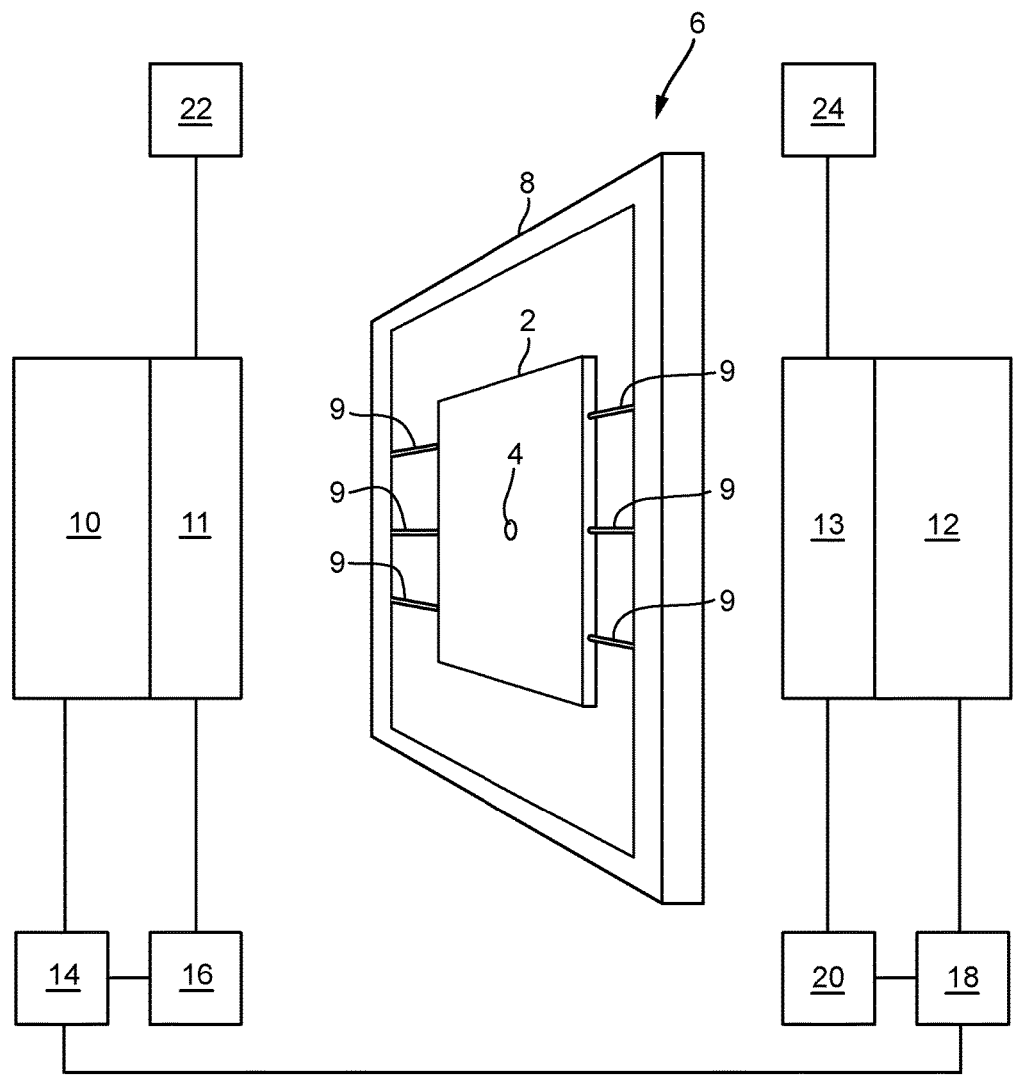
FIG. 2 is a schematic illustration (not to scale) of apparatus for performing a countersinking process.

FIG. 2 is a schematic illustration (not to scale) of apparatus 6 for performing a countersinking process. The countersinking process is to countersink (to the pre-determined depth) the hole 4 at the front surface of the panel 2.

A countersinking process is an example of a drilling process. The terminology "drilling process" is used herein to refer to any type of drilling process including, but not limited to, drilling a hole, countersinking (a pre-drilled hole), reaming, etc.

The apparatus 6 comprises a fixture system 8, a plurality of clamps 9, a first robot 10, a first end effector 11, a second robot 12, a second end effector 13, a first robot controller 14, a first end effector controller 16, a second robot controller 18, a second end effector controller 20, a first swarf extraction module 22, and a second swarf extraction module 24.

The fixture system 8 is a frame in which the panel 2 is clamped using the plurality of clamps 9. In this embodiment, the fixture system 8 is a conventional fixture system which typically comprises a jig, the framework of which is made by joining standard steel beams. The clamps 9 are conventional clamps.

The first robot 10 is a conventional industrial robot arm, or robotic arm, for use in a countersinking process. For example, the first robot arm 10 is a robot arm manufactured by Kuka Gmbh (Trademark).

The first end effector 11 is coupled to an end of the first robot arm 10 such that the first robot 10 may move the first end effector 11. The first robot 10 and the first end effector 11 are positioned at a front side of the fixture system 8, i.e. in front of the front surface of the panel 2 so that the front surface of the panel 2 is accessible by the first robot 10 and the first end effector 11.

The first robot 10 and the first end effector 11 can be conveniently thought of as a single module, e.g. a first module, a drilling module, or a drilling apparatus.

The first end effector 11 will be described in more detail later below with reference to FIG. 3.

The second robot 12 is a conventional industrial robot arm, or robotic arm, for use in a countersinking process. For example, the second robot 12 is a robot arm manufactured by Kuka Gmbh (Trademark).

The second end effector 13 is coupled to an end of the second robot arm 12 such that the second robot 12 may move the second end effector 13. The second robot 12 and the second end effector 13 are positioned at a rear side of the fixture system 8, i.e. behind of the rear surface of the panel 2 so that the rear surface of the panel is accessible by the second robot 12 and the second end effector 13.

The second robot 12 and the second end effector 13 can be conveniently thought of as a single module, e.g. a second module, a supporting module, or a supporting apparatus.

The second end effector 13 will be described in more detail later below with reference to FIG. 4.

The first robot 10 is coupled to the first robot controller 14 in such a way that the first robot 10 is controlled by the first robot controller 14.

The first end effector 11 is coupled to the first end effector controller 16 in such a way that the first end effector 11 is controlled by the first end effector controller 16.

The first robot controller 14 and the first end effector controller 16 are coupled together such that they may communicate.

The second robot 12 is coupled to the second robot controller 18 in such a way that the second robot 12 is controlled by the second robot controller 18.

The second end effector 13 is coupled to the second end effector controller 20 in such a way that the second end effector 13 is controlled by the second end effector controller 20.

The second robot controller 18 and the second end effector controller 20 are coupled together such that they may communicate.

The first robot controller 14 and the second robot controller 18 are conventional controlling units for controlling the first robot 10 and second robot 12 respectively.

The first robot controller 14 and the second robot controller 18 are coupled together such that they may communicate. In particular, in this embodiment the first and second robot controllers 14, 18 are coupled together such that, in a first mode of operation, the first and second robots 10, 12 have a "master-slave relationship", i.e. such that if the first robot 10 is moved then the second robot 12 is also moved such that the relative position between the first and second robots 10, 12 is substantially maintained. Also, in this embodiment, in this embodiment the first and second robot controllers 14, 18 are coupled together such that, in a second mode of operation, the first and second robots 10, 12 may be moved independently from one another.

Instructions for moving the first and second robots 10, 12 reside in the first and second robot controllers 14, 18 respectively, e.g. either as an off-line program (OLP) or a sub-routine called by the off-line program.

The first swarf extraction system 22 is a conventional swarf extraction system. The first swarf extraction system 22 is coupled to the first end effector 11 and is configured to extract swarf (i.e. debris or waste, e.g. turnings, chippings, filings, dust or shavings) that results from the below described countersinking process.

The second swarf extraction system 24 is a conventional swarf extraction system. The second swarf extraction system 24 is coupled to the second end effector 13 and is configured to extract swarf (i.e. debris or waste, e.g. turnings, chippings, filings, or shavings) that results from the below described countersinking process.

In some embodiments, a different number of swarf extraction systems, for example one, is used.

Figure 3:
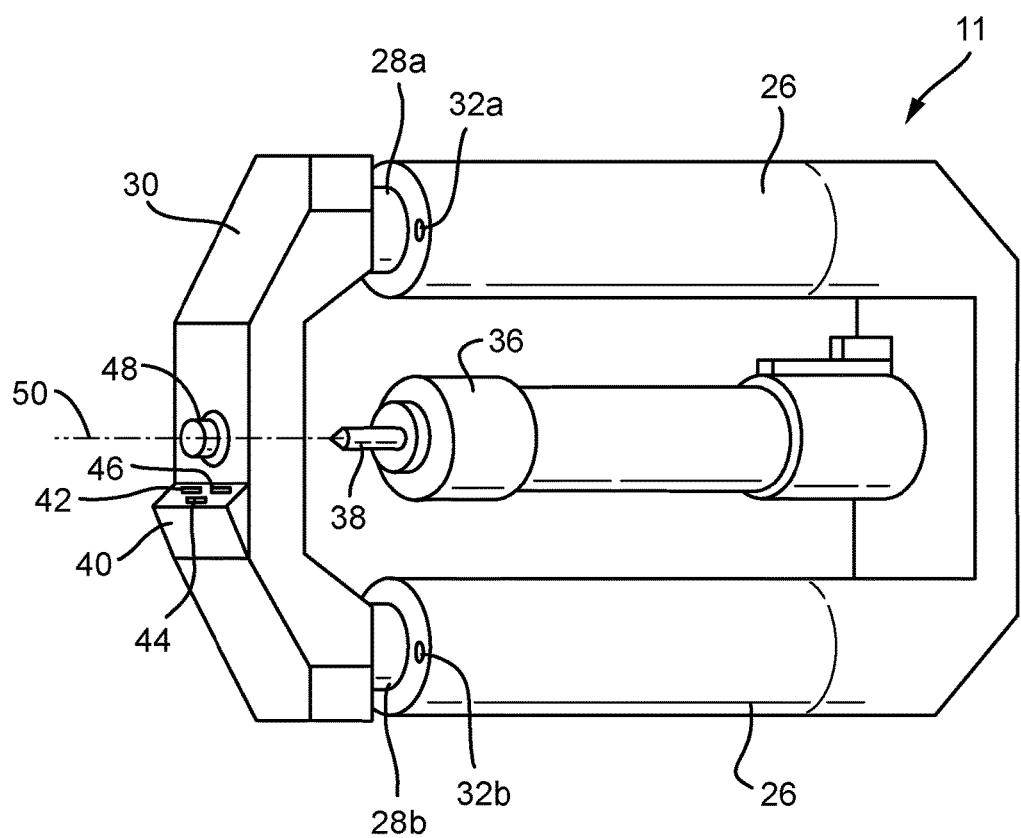
FIG. 3 is a schematic illustration (not to scale) of a first end effector.

FIG. 3 is a schematic illustration (not to scale) of the first end effector 11.

In this embodiment, the first end effector 11 comprises a first frame 26, two air cylinders 28*a*, 28*b*, a pressure foot 30, two range measurement devices 32*a*, 32*b*, a drilling system 36 (which comprises a cutting tool 38, i.e. a countersink), and a vision and normalisation system 40 (which comprises a camera 42, a laser 44, and a lighting system 46).

The first frame 26 of the first end effector 11 is attached to the first robot 10.

The air cylinders 28*a-b* are attached between a distal end of the first frame 26 and the pressure foot 30 such that, under action of the air cylinders 28, the pressure foot 30 may be moved with respect to the first frame 26 (i.e. the pressure foot 30 may be extended from the first frame 26).

The pressure foot 30 is a conventional pressure foot used by conventional robotic systems. The pressure foot 30 may, under action of the air cylinders 28*a-b*, be extended from the first frame 26 until a front surface of the pressure foot 30 contacts (i.e. presses against) the front surface of the panel 2, at which point movement of the pressure foot 30 with respect to the first frame 26 is stopped.

The range measurement devices 32*a-b* are attached to the first frame 26. Each range measurement devices 32*a-b* is configured to measure a distance moved by a respective portion of the pressure foot 30 with respect to the first frame 26. In other words, each range measurement device 32*a-b* is configured to measure a distance from the first frame 26 that a respective part of the pressure foot 30 is extended. In this embodiment, each range measurement device 32*a-b* comprises a laser range measurement device that projects laser light from the first frame 26 to the pressure foot, and determines a distance between the first frame 26 and the pressure foot 30 by analysing laser light reflected back from the pressure foot 30 to the first frame 26. In other embodiments, a different type of range sensor may be used.

In this embodiment, a first of the range measurement devices 32*a* is located at or proximate to a first side of the first frame 26. The first range measurement devices 32*a* is located at or proximate to a first of the air cylinders 28*a*, the first air cylinder 28*a* being attached to the first side of the first frame 26. The first range measurement device 32*a* is configured to measure a distance between the first side of the first frame 26 and a first end of the pressure foot 30. Preferably, the first range measurement device 32*a* is configured to project laser light onto the first end of the pressure foot 30 in a direction that is substantially parallel (e.g. along) an axis of the first air cylinder 28*a*.

In this embodiment, a second of the range measurement devices 32*b* is located at or proximate to a second side of the first frame 26, the second side of the first frame 26 being opposite to the first side of the first frame 26. The second range measurement device 32*b* is located at or proximate to a second of the air cylinders 28*b*, the second air cylinder 28*b* being attached to the second side of the first frame 26. The second range measurement device 32*b* is configured to measure a distance between the second side of the first frame 26 and a second end of the pressure foot 30, the second end of the pressure foot 30 being opposite to the first end of the pressure foot 30. Preferably, the second range measurement device 32*b* is configured to project laser light onto the second end of the pressure foot 30 in a direction that is substantially parallel (e.g. along) an axis of the second air cylinder 28*b*. In this embodiment, the axis of the first air cylinder 28*a* is substantially parallel with the axis of the second air cylinder 28*b*.

Measurements made by the range measurement devices 32*a-b* are sent from the first end effector 11 to the first end effector controller 16 as described in more detail later below with reference to FIG. 5.

The pressure foot 30 comprises a passage 48 (i.e. an aperture or hole) through its structure. In this embodiment, the vision and normalisation system 40 is attached to the front surface of the pressure foot 30.

The drilling system 36 comprises a drive device which, in operation, drives (i.e. rotates) the cutting tool 38.

The drilling system 36 is slideably mounted to first frame 26 such that the drilling system 36 may be moved along a surface of the first frame 26 in a direction parallel to the axis of the cutting tool 38. In this embodiment, the drilling system 36 is arranged such that a longitudinal axis of the cutting tool 38 (which is shown in FIG. 3 as a dotted line indicated by the reference numeral 50) passes through the passage 48 in the pressure foot 30. Thus, the cutting tool 38 may be moved along its longitudinal axis 50 such that at least a portion of the cutting tool 38 passes completely through the passage 48. In operation, as described in more detail later below, to countersink the hole 4, the cutting tool 38 is moved along its longitudinal axis 50, through the passage 48, and towards the panel 2 until it contacts the front surface of the panel 2 at the hole 4. The cutting tool 38 is then moved further to countersink the hole 4 of the panel 2 to a pre-determined depth.

In this embodiment, the vision and normalisation system 40 is a Lucana Aero (Trademark) system by Recognition Robotics (Trademark). However, in other embodiments, the vision and normalisation system 40 is a different appropriate system.

The vision and normalisation system 40 comprises the camera 42 which may, for example, be an industrial CCD or CMOS camera. The vision and normalisation system 40 also comprises the laser 44.

The camera 42 is configured to capture images of the front surface of the aircraft panel 2.

In this embodiment, as described in more detail later below with reference to FIG. 5, the vision and normalisation system 40 is configured to locate the hole 4 on the panel 2 and then normalise the first end effector 11 with respect to the aircraft panel 2, such that an axis of the hole 4 is substantially aligned with the longitudinal axis 50 of the cutting tool 38.

In this embodiment the lighting system 46 is configured to shine visible light onto the front surface of the aircraft panel 2. The camera 42 is configured to detect the visible light shone onto the aircraft panel by the lighting system 46. In some embodiments, the lighting system 46 and the camera 42 may be configured to use different wavelengths electromagnetic radiation instead of or in addition to visible light.

In this embodiment, the movement of the pressure foot 30 by the air cylinders 28 is controlled by the first end effector controller 16. Also, the operation of the drilling system 36 is controlled by the first end effector controller 16. Also, the operation of the vision and normalisation system 40 is controlled by the first robot controller 16. Also, the operation of the lighting system 46 is controlled by the first robot controller 16.

In this embodiment, measurements of the distances moved by the first and second ends of the pressure foot 30 with respect to the first frame 26 may be sent, to the first end effector controller 16, by the first and second range measurement devices 32 respectively. Also, measurements or images taken by the camera 42 may be sent to first robot controller 14 and/or another processor.

Figure 4:
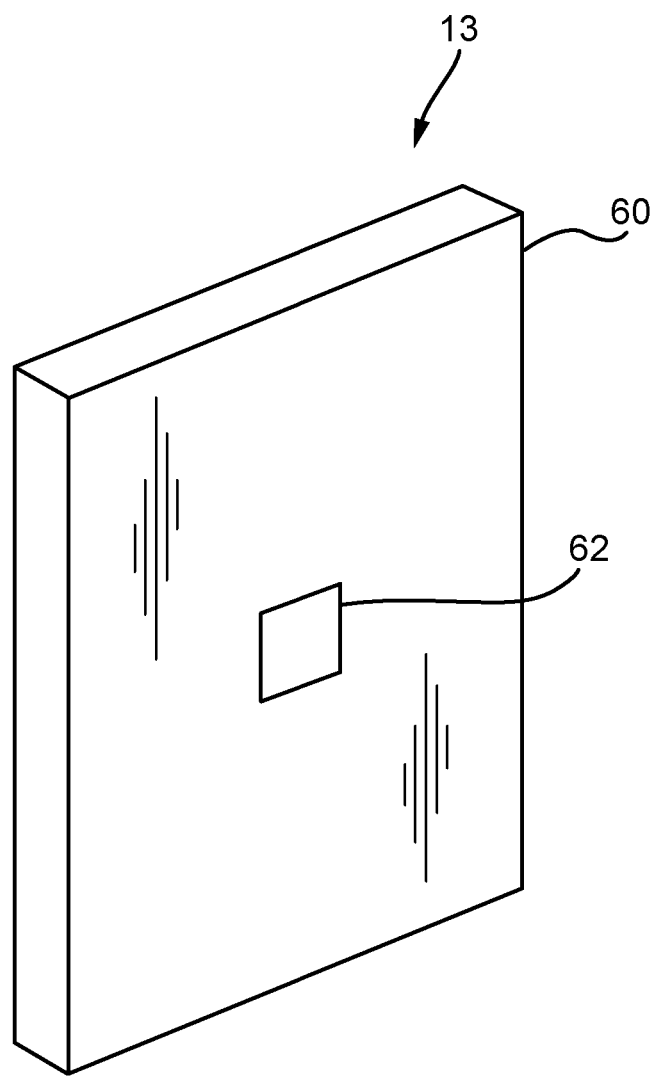
FIG. 4 is a schematic illustration (not to scale) of a second end effector.

FIG. 4 is a schematic illustration (not to scale) of the second end effector 13.

In this embodiment, the second end effector 13 comprises a second frame 60 and a load sensor 62.

The second frame 60 of the second end effector 13 is attached to the second robot 12.

In operation, the second robot 12 is controlled such that a front surface of the second frame 60 is moved into contact with a rear surface of the panel 2. The load sensor 62 is attached to the front surface of the second frame 60. The load sensor 62 is configured to measure a load or force exerted on the aircraft panel 2 by the second end effector 13. The load sensor 62 is configured to send the load measurements to the second robot arm controller 18.

Swarf extraction may be performed at or proximate to the front surface of the second frame 60.

Figure 5:
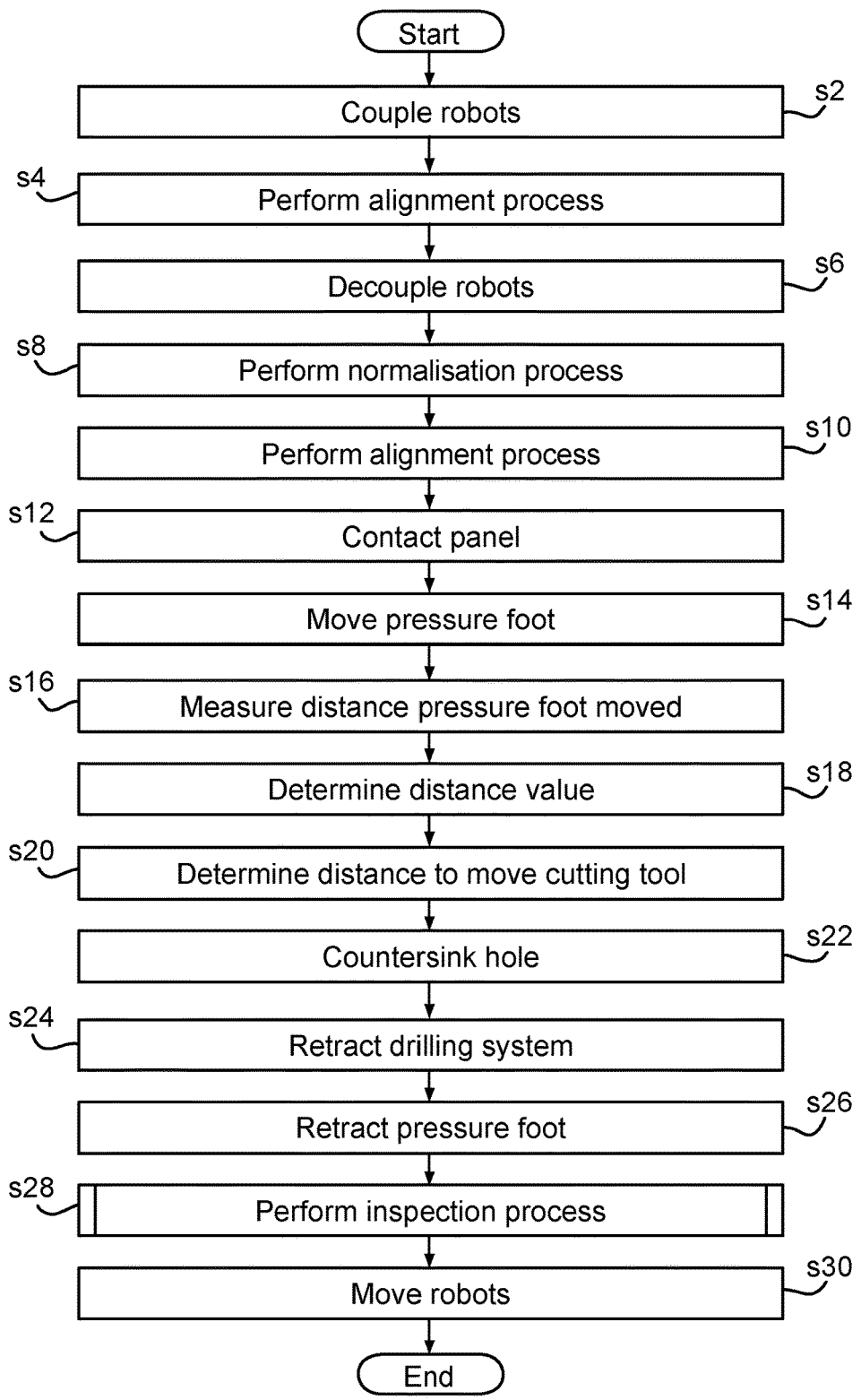
FIG. 5 is a process flow chart showing certain steps of an embodiment of a countersinking process.

FIG. 5 is a process flow chart showing certain steps of an embodiment of a countersinking and inspection process.

At step s2, the first robot 10 and the second robot 12 are linked (or coupled) together. This is done so that if the first robot 10 moves to a new position from its previous position, the second robot 12 moves such that the position of the second robot 12 with respect to the first robot 10 is maintained (i.e. such the positions of the robots 10, 12 relative to each other is kept substantially the same), and vice versa.

In this embodiment, the first robot 10 moves to an off-line programmed position corresponding to the hole 4. This position is defined in a program running on first robot controller 14. The second robot 12 moves so as to follow its own pre-programmed path.

At step s4, an alignment process is performed. This alignment process comprises moving the first end effector 11 such that the longitudinal axis 50 of the cutting tool 38 is aligned along an axis of the hole 4.

In this embodiment, the camera 42 is used to perform the alignment process. Measurements taken by the camera 42 are used, for example by the robot arm controllers 14, 18, to position the end effectors 11, 13 relative to the hole 4. In some embodiments the alignment process may include the lighting system 46 illuminating the front surface of the panel 2 with visible light. However, in other embodiments, a different appropriate alignment process may be performed.

At step s6, the first robot 10 and the second robot 12 are unlinked (or de-coupled) from each other. In other words, after step s4, the robots 10, 12 may moves independently from one another.

At step s8, a normalisation process is performed. This normalisation process comprises moving the first end effector 11 such that the longitudinal axis 50 of the cutting tool 38 is normal (i.e. perpendicular) to the front surface of the panel 2.

In this embodiment, the laser 44 and the camera 42 are used to perform the normalisation process. The laser 44 projects laser light, for example in the shape of a cross-hair, onto the front surface of the panel 2. The camera 42 captures images of the projected laser light on the front surface of the panel 2. Measurements taken by the camera 42 are used, for example by the first robot arm controller 14, to determine a curvature of the front surface of the panel 2. The first robot arm controller 14 uses the determined curvature to move the first end effector 11 such that the longitudinal axis 50 of the cutting tool 38 is normal to the front surface of the panel 2. However, in other embodiments, a different appropriate normalisation process may be performed.

At step s10, optionally, the alignment process of step s4 may be re-performed. This may be done so that, if during the normalisation process of step s8, the cutting tool 38 is moved out of alignment with the hole 4, the cutting tool 38 is realigned with the hole 4.

At step s12, the second robot controller 18 controls the second robot 12 to move such that the front surface of the second frame 60 contacts with, and exerts a predetermined load on, the rear surface of the panel 2.

In this embodiment, as the second frame 60 is moved into contact with the rear surface of the panel 2, the load sensor 62 sends measurements of the load exerted on the panel 2 by the second frame 60 to the second robot controller 18. The second robot controller 18 controls the second robot 12 to force the second frame 60 against the rear surface of the panel 2 until the load measured by the load sensor 62 equal to the predetermined load. Once, the load measured by the load sensor 62 is equal to the predetermined load, the second robot controller 18 prevents or opposes further movement of the second robot 12 and the second end effector 13, for example, by locking the joints of the second robot 12.

Thus, in this embodiment, the second end effector 13 exerts a predetermined load on the panel 2. In this embodiment, the predetermined load value is less than or equal to 5N, for example 2N. However, in other embodiments, the predetermined load value is a different value.

The predetermined load exerted by the second frame 60 on the rear of the panel 2 is relatively small. This advantageously tends to provide that the panel 2 is not significantly deflected by the second end effector 13. The second end effector 13 advantageously tends to provide a rigid "anvil" structure for the panel 2 that tends to prevent or oppose deflection of the panel 2 during countersinking of the hole 4.

Use of the load sensor 62 in moving the second frame 60 against the rear surface of the panel 2 advantageously tends to eliminate any requirement for knowing a distance between the front surface of the second frame 60 and the rear surface of the panel 2. In this embodiment, the second frame 60 is moved towards the rear surface of the panel 2 until the load sensor 62 read-out a load value equal to the predetermined load value. This advantageously tends to provide that manufacturing tolerances in the front surface of the second frame 60 and/or the rear surface of the panel 2 may be accounted for.

At step s14, the first end effector controller 16 controls the air cylinders 28a-b to extend the pressure foot 30 from the first frame 26 until the front surface of pressure foot 30 contacts the front surface of the panel 2.

In this embodiment, extension of the pressure foot 30 from the first frame 26 is stopped once the pressure foot 30 comes into contact with the front surface of the panel 2. Such movement of the pressure foot 30 advantageously causes the panel to be clamped between the front surface of the second frame 60 and the front surface of the pressure foot 30. This clamping of the panel 2 tends to be secure so that movement (e.g. deflection or bending) of the panel 2, at least in the vicinity of the hole 4, tends to be prevented or opposed.

At step s16, measurements of how far the pressure foot 30 has been moved away from the first frame 26 at step s22 are taken by the range measurement devices 32*a-b*. These distance measurements are sent from the first end effector 11 to the first end effector controller 16.

In this embodiment, the first range measurement device 32*a* measures a distance that the first end of the pressure foot 30 is moved away from the first side of the first frame 26 by the first air cylinder 28*a*. This distance measured by the first range measurement device 32*a* is hereinafter referred to as the "first distance measurement". Also, in this embodiment, the second range measurement device 32*b* measures a distance that the second end of the pressure foot 30 is moved away from the second side of the first frame 26 by the second air cylinder 28*b*. This distance measured by the second range measurement device 32*b* is hereinafter referred to as the "second distance measurement".

At step s18, using the first distance measurement and the second distance measurement, the first end effector controller 16 determines a distance value representative of how far the pressure foot 30 has been moved away from the first frame 26.

In this embodiment, the distance value determined by the first end effector controller 16 is an average of the first distance measurement and the second distance measurement. However, in other embodiments, the distance value representative of how far the pressure foot 30 has been moved away from the first frame 26 is calculated in a different way, for example, the distance value may be a different function of the first distance measurement and the second distance measurement.

At step s20, the first end effector controller 16 determines how far the cutting tool 38 is to be moved along its axis 46 in order to drill, along the axis of the hole 4 with which it is aligned, to the desired pre-determined depth.

In this embodiment, this distance to be moved by the cutting tool 38 along its axis 46 is determined using (e.g. by adding together): (i) the distance between the tip of the cutting tool 38 and the front of the pressure foot 30 when the pressure foot has not been extended from the first frame 26; (ii) the distance value determined by the first end effector controller 16 at step s18; and (iii) the pre-determined depth. The distance between the tip of the cutting tool 38 and the front of the pressure foot 30 when the pressure foot 30 has not been extended from the first frame 26 is a known distance.

In some embodiments, each air cylinder 28*a-b* may move the pressure foot 30 away from the first frame 26 at a different rate and/or through a different distance. Thus, in effect, the pressure foot 30 may be rotated, or "twisted", about an axis. In some embodiments, the distance that the first end of the pressure foot 30 is moved away from the first side of the first frame 26 may be different to the distance that the second end of the pressure foot 30 is moved away from the second side of the first frame 26. In such situations, the first distance measurement is different from the second distance measurement.

For, systems in which only a single range measurement device is used to measure the distance that the pressure foot 30 is moved away from the first frame 26, if the pressure foot 30 is rotated or "twisted", for example as described in the preceding paragraph, the measurement of the distance that the pressure foot 30 is moved may be relatively inaccurate. This may lead to the countersink being drilled to a depth that is not within tolerance. Systems in which only a single range measurement device is used to measure the distance that the pressure foot 30 is moved away from the first frame 26 tend not to be capable of accounting for the above mentioned rotation or "twisting" of the pressure foot 30.

Advantageously, use of two or more range measurement devices tends to account for the above described twisting or rotation of the pressure foot 30. Use of two or more range measurement devices for measuring the distance that the pressure foot 30 is moved away from the first frame 26 tends to provide for improved distance measurement accuracy. Thus, improved countersink drilling tends to be provided. In particular, the distance value determined by the first end effector controller 16 at step s18 (i.e. the function of the first distance measurement and the second distance measurement) tends to provide improved countersinking results compared to approaches in which only a single range measurement device is used to measure the distance that the pressure foot 30 is moved away from the first frame 26.

Advantageously, the two range measurement devices 32*a-b* are arranged to measure movement (with respect to the first frame 26) of respective extreme portions of the pressure foot 30. This tends to provide that any rotation or twisting of pressure foot 30 is represented by the distance measurements taken by the range measurement devices 32*a-b*.

In some embodiments, a different number of range measurement devices is implemented. Preferably, at least two range measurement devices are used. In some embodiments, more than two range measurement devices are implemented.

At step s22, the first end effector controller 16 controls the first end effector 11 to activate the drilling system 36 and move the cutting tool 38 along its longitudinal movement axis 46 by the distance determined at step s20.

Thus, the cutting tool 38 is activated and moved along its axis 46 so as to drill into the panel 2 along the length of the hole 4 to the pre-determined depth, i.e. to countersink the hole 4.

In this embodiment, during the drilling/countersinking process, the swarf extraction systems 22, 24 are activated so as to extract swarf.

At step s24, when the cutting tool 38 has been moved so as to countersink the hole 4 to the pre-determined depth, and the cutting tool has dwelled for a pre-determined amount of time, the drilling system 36 is retracted from the panel 2 (under control of the first end effector controller 16).

The swarf extraction systems 22, 24 are deactivated once the cutting tool 38 has been retracted from the panel 2.

At step s26, under control of the first end effector controller 16, the pressure foot 30 is retracted back to its starting position relative to the first frame 26.

At step s28, a countersink inspection process is performed to inspect the countersunk hole 4. The countersink inspection process is described in more detail later below with reference to FIG. 6.

At step s30, under control of their respective robot controllers 14, 18, the first and second robots 10, 12 are moved back to their starting positions.

Thus, a countersinking process is provided. This process may be repeated for any number of holes drilled through the panel 2.

Figure 6:
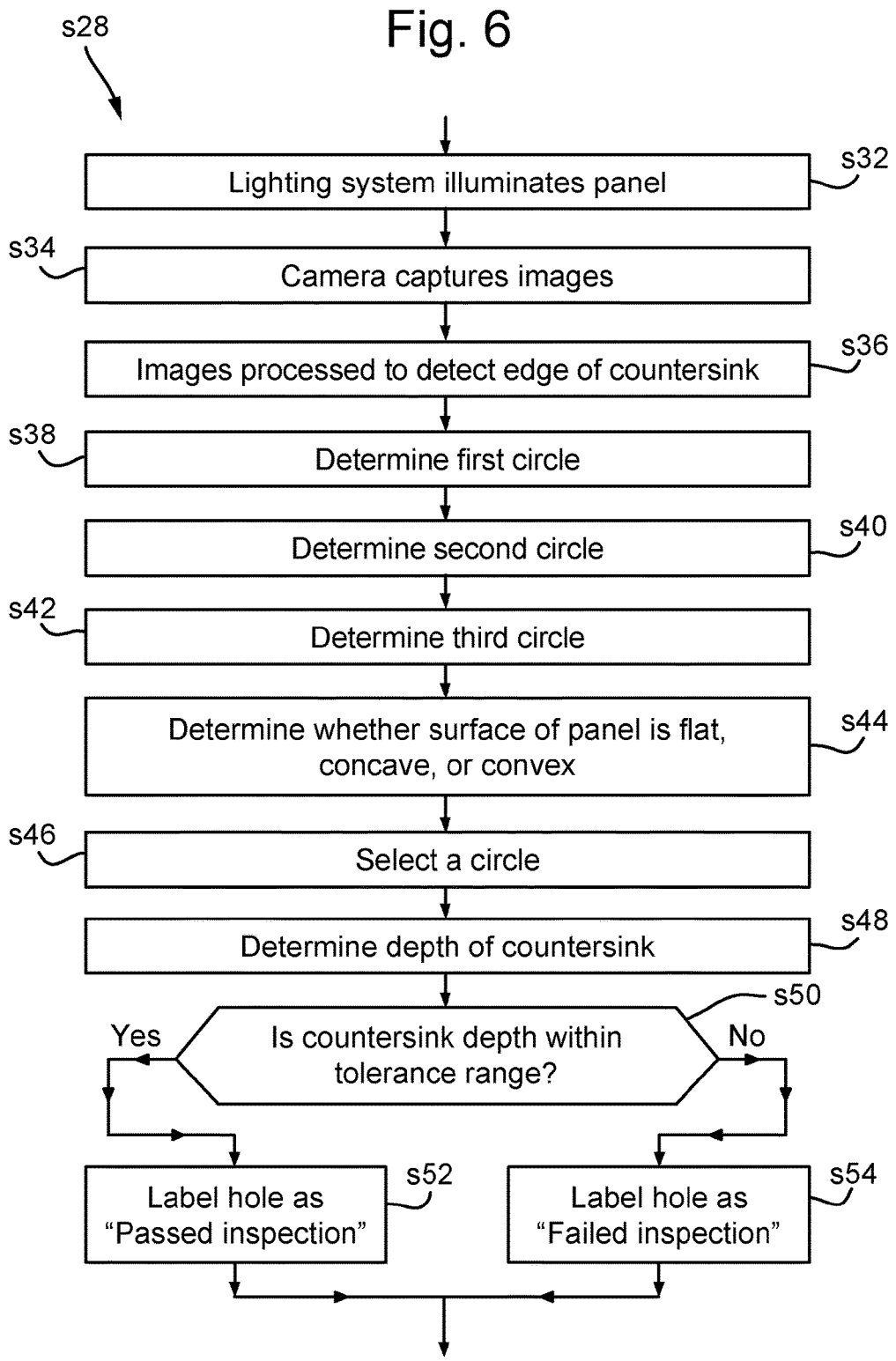
FIG. 6 is a process flow chart showing certain steps of an inspection process performed during the countersinking process.

FIG. 6 is a process flow chart showing certain steps of the countersink inspection performed at step s28 of the process of FIG. 5.

At step s32, the lighting system 46 illuminates the front surface of the panel 2 with visible light. In some embodiments, different wavelengths of electromagnetic radiation may be used instead or in addition to visible light, for example, infrared or ultraviolet light. In this embodiment, at the portion of the front surface of the panel that is at and proximate to the countersunk hole 4 is illuminated.

At step s34, the camera 42 captures an image of the illuminated front surface of the panel 2.

In this embodiment, the captured image is sent from the camera 42 to a processor (for example, the first robot controller 14 and/or the first end effector controller 16).

At step s36, the processor processes the image captured by the camera 42 to detect an edge between the countersunk portion of the hole 4 and the front surface of the panel 2.

Advantageously, illuminating the front surface of the panel 2 with visible light tends to increase the contrast in the captured images between the relatively dark countersunk portion of the hole 4 and the relatively light (e.g. painted) front surface of the panel 2. Detection of the edge of the countersunk portion of the hole tends to be facilitated by this increase in contrast.

In this embodiment, the shape of the detected edge between the countersunk portion of the hole 4 and the front surface of the panel 2 is either a circle (if the front surface of the panel 2 is flat in the vicinity of the hole 4), or an ellipse (if the front surface of the panel 2 is curved in the vicinity of the hole 4).

Steps s38 to s42 describe an image processing method that is defined in software implementable by the processor.

Figure 7:
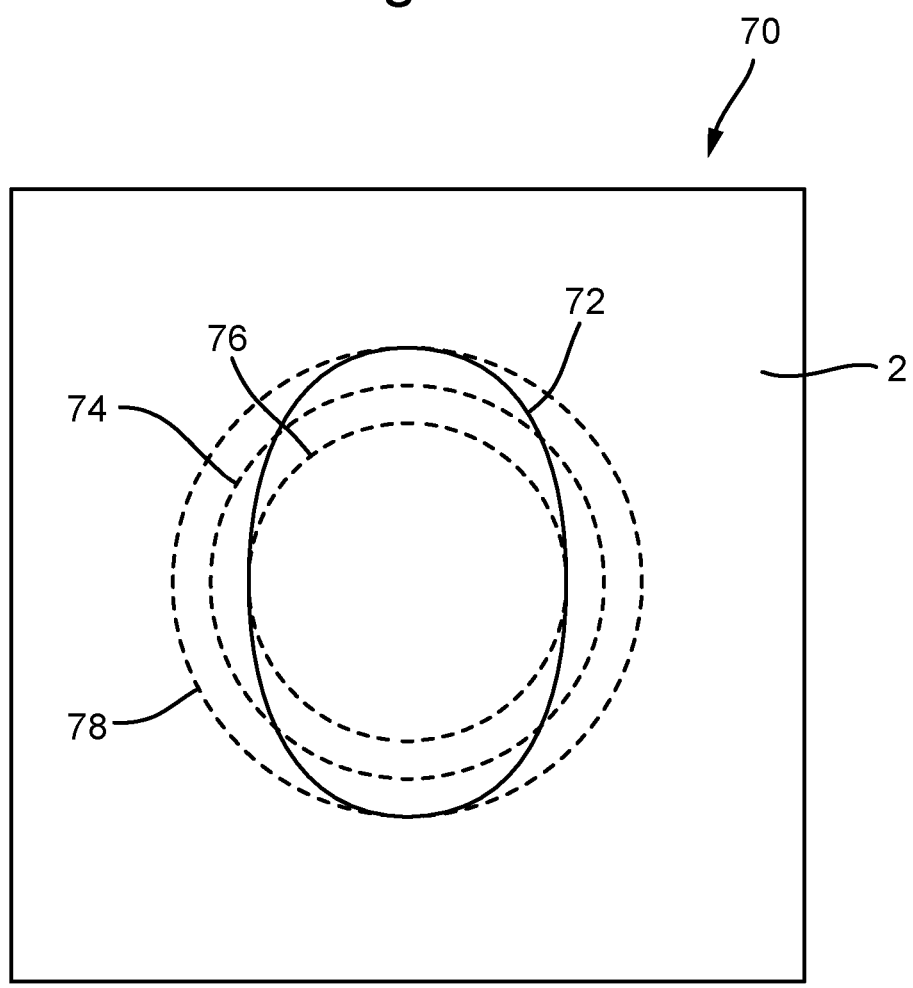
FIG. 7 is a schematic illustration (not to scale) showing an image captured during the inspection process.

FIG. 7 is a schematic illustration (not to scale) showing an image 70 captured by the camera 42 that is useful in understanding the process steps s38 to s42. The image 70 comprises inter alia a portion of the front surface of the panel 2 and the detected edge 72 between the countersunk portion of the hole 4 and the front surface of the panel 2.

In this embodiment, the detected edge 72 is an ellipse.

At step s38, using the detected edge 72, the processor determines a first circle 74 (indicated by a dotted line in FIG. 7).

In this embodiment, the first circle 74 is a "best fit" or "geometric fit" circle that is fit to the detected edge 72. A geometric algorithm may be used to fit the first circle 74 to the detected edge 72.

In this embodiment, the first circle 74 is a circle for which the sum of the squares of the distances to points along the detected edge 74 is minimal. However, in other embodiments, the first circle 74 may be a different best-fit circle.

In this embodiment, the detected edge 72 is an ellipse. Thus, the first circle 74 tends not to be coincident with the detected edge 72. In embodiments in which the detected edge 72 is a circle, the first circle 74 tends to be coincident with the detected edge 72.

FIG. 7 shows the calculated first circle 74 superimposed (or augmented) onto the image 70.

At step s40, using the detected edge 72, the processor determines a second circle 76 (indicated by a dotted line in FIG. 7).

In this embodiment, the determination of the second circle 76 is independent from the determination of the first circle 74.

In this embodiment, the second circle 76 is concentric with the first circle 74. Also, the second circle 76 has a diameter that is equal to a minor axis of the elliptical detected edge 72. Any appropriate algorithm may be used by the processor to calculate the second circle 76. Such algorithms may include determining the centre of the first circle 74 and determining a length of the minor axis of the elliptical detected edge 72.

In this embodiment, the detected edge 72 is an ellipse. Thus, the second circle 76 tends not to be coincident with the detected edge 72. In embodiments in which the detected edge 72 is a circle, the second circle 76 tends to be coincident with the detected edge 72 (and the first circle 74). Thus, in some embodiments in which the detected edge 72 is a circle, determination of the second circle 76 may be omitted.

FIG. 7 shows the calculated second circle 76 superimposed (or augmented) onto the image 70.

At step s42, using the detected edge 72, the processor determines a third circle 78 (indicated by a dotted line in FIG. 7).

In this embodiment, the determination of the third circle 78 is independent from the determination of the first circle 74 and the second circle 76.

In this embodiment, the third circle 78 is concentric with the first circle 74 and the second circle 76. Also, the third circle 78 has a diameter that is equal to a major axis of the elliptical detected edge 72. Any appropriate algorithm may be used by the processor to calculate the third circle 78. Such algorithms may include determining the centre of the first circle 72 and determining a length of the major axis of the elliptical detected edge 72.

In this embodiment, the detected edge 72 is an ellipse. Thus, the third circle 78 tends not to be coincident with the detected edge 72. In embodiments in which the detected edge 72 is a circle, the third circle 76 tends to be coincident with the detected edge 72 (and the first circle 74). Thus, in some embodiments in which the detected edge 72 is a circle, determination of the third circle 78 may be omitted.

FIG. 7 shows the calculated third circle 78 superimposed (or augmented) onto the image 70.

At step s44, the processor determines whether the front surface of the panel 2 at (and proximate to) the countersunk hole 4, with respect to the camera 42, is either flat, concave, or convex. This may be determined from CAD files that specify the aircraft panel 2.

At step s46, the processor selects a circle 74, 76, 78.

In this embodiment, if at step s44 it was determined that the front surface of the panel 2 at the countersunk hole 4, with respect to the camera 42, is flat, the processor selects the first circle 74.

However, if at step s44 it was determined that the front surface of the panel 2 at the countersunk hole 4, with respect to the camera 42, is concave, the processor selects the second circle 76.

However, if at step s44 it was determined that the front surface of the panel 2 at the countersunk hole 4, with respect to the camera 42, is convex, the processor selects the third circle 78.

At step s46, using the selected circle 74, 76, 78, the processor determines the depth to which the hole 4 has been countersunk.

In this embodiment, to determine the countersink depth, the processor acquires a point angle, or cutting angle, angle of the cutting tool 38. This point angle is hereinafter referred to as the "angle" of the cutting tool 38. The terminology "point angle" is used herein to refer to the angle formed at the tip of a cutting tool or drill bit. The angle of the cutting tool 38 may have been accurately measured, for example using a Kelch pre-setter, and store in a memory. For example, the angle of the cutting tool 38 may be stored, along with other data, on a Radio Frequency Identification (RFID) chip associated with the cutting tool 38.

The processor may then use the selected circle 74, 76, 78 and the angle of the cutting tool 38 to calculate the depth to which the hole 4 has been countersunk. Basic trigonometrical functions may be used. For example, the processor may determine, as the countersink depth, using a trigonometrical function, a distance between the tip of the intersection of the cutting edges of the cutting tool and a point along the length of the cutting tool 38 at which the diameter of the cutting tool 38 is equal to the diameter of the selected circle 74, 76, 78.

In this embodiment, the point angle of the cutting tool 38 is used to determine the depth of the countersink. However, in other embodiments, a different angle may be used, for example, a lip angle of the cutting tool 38.

At step s50, the processor determines whether or not the determined countersink depth is within a predefined tolerance range.

If, at step s50, the processor determines that the determined countersink depth is within the predefined tolerance range, the method proceeds to step s52.

However, if at step s50, the processor determines that the determined countersink depth is outside the predefined tolerance range, the method proceeds to step s54. Step s54 will be described in more detail later below after a description of step s52.

At step s52, in response to determining that the determined countersink depth is within the predefined tolerance range, the countersunk hole 4 is labelled as "inspection passed". In other words, it is determined that the hole 4 has been countersunk to a desired depth.

After step s52, the process of FIG. 6 ends, and the method proceeds to step s30 of the process of FIG. 5.

At step s54, in response to determining that the determined countersink depth is not within the predefined tolerance range, the countersunk hole 4 is labelled as "inspection failed". In other words, it is determined that the hole 4 has not been countersunk to a desired depth.

In this embodiment, the aircraft panel 2 may subsequently be processed to fix or repair any out of tolerance countersunk holes. In some cases, as a result of countersunk holes being out of tolerance, the panel 2 may be scrapped.

After step s54, the process of FIG. 6 ends, and the method proceeds to step s30 of the process of FIG. 5.

Thus, a countersink inspection method is provided.

The above described countersink inspection method advantageously provides a countersink validation method that may be used to determine a countersink depth of countersinks formed in flat, concave, and convex surfaces.

An advantage of the above provided countersinking process, is that the process is performed using commercially available, "off-the shelf" industrial robots. Furthermore, it tends to be possible to use the same robots to perform the countersinking/drilling process on any type of panel or part, and on any shape of panel or part. Thus, the use of relatively expensive machine tools tends to be advantageously avoided.

The robots used in the above described countersinking process may use different sized/shaped cutting tools. Thus, the robots may be used to perform many types of drilling/countersinking operations. To account for different sizes/shapes of cutting tools, a size (e.g. a length and an angle) of a cutting tool may be measured accurately on a Kelch pre-setter. This data, along with other data e.g. like tool number, tool life etc., may be stored on a Radio Frequency Identification (RFID) chip attached to the chuck. When a tool is selected from a tool changer, the data stored on the RFID chip may be read by a reader linked to the controlling unit. The system may then determine, for example, which tool it is using, how many holes it can drill before the tool must be changed, and the length of the tool. The tool length may be used in the determination of how far along its axis the cutting tool should be moved in order to drill into a panel/part to a desired pre-determined depth. Tool life may advantageously be monitored by decrementing the available life of a tool each time a hole is countersunk with that tool, and storing the decremented tool life on the RFID chip for that tool.

During drilling, the second robot advantageously tends to be in contact with the rear surface of the panel/part being drilled. This tends to provide that the second robot applied to the panel an equal and opposite force to that applied during drilling by the first robot. In other words, the panel is secured (so that at least the portion of the panel proximate to the point being drilled tends not to bend or deflect during the drilling operation) by the actions of the first and second robots.

Apparatus, including the controllers 14, 16, 18, 20, for implementing the above arrangement, and performing the method steps described above, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 5 and 6, and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the countersinking process is performed on a (flat or non-flat) panel. The panel is made of carbon fibre and is for fixing to a structure to form an airframe. However, in other embodiments, the countersinking process is performed on a different type of part, e.g. a part made of one or more different types of material, or a part for a different purpose.

In the above embodiments, the process performed on the panel/part is a countersinking process (for countersinking a predrilled hole). However, in other embodiments, the process performed is a different type of drilling/cutting process, e.g. a process of drilling holes in a part/panel, which e.g. may be countersunk later.

The invention claimed is:

1. An apparatus for determining a specific depth of a feature formed in a surface of an object, the feature having been formed through the surface of the object by a cutting tool, the apparatus comprising:
   a camera configured to capture an image of the feature and a portion of the surface of the object proximate to the feature; and
   one or more processors operatively coupled to the camera and configured to:

detect, in the image, an edge of the feature between the feature and the surface of the object;

using the detected edge, calculate a diameter for a circle;

acquire a point angle of the cutting tool;

determine whether the portion of the surface of the object proximate to the feature has one of three curvatures selected from:
  a curvature substantially equal to zero,
  a curvature substantially concave relative to the camera, and
  a curvature substantially convex relative to the camera; and, responsive to determining that the portion of the surface of the object proximate to the feature has curvature substantially equal to zero, using the diameter of the best fit circle that best fits to the detected edge, and the acquired point angle, calculate a depth value for the feature;

responsive to determining that the portion of the surface of the object proximate to the feature is concave relative to the camera, and wherein a shape of the detected edge in the image is substantially an ellipse, using the diameter of the circle equal to a minor axis of the ellipse and the acquired point angle, calculate the depth value for the feature;

responsive to determining that the portion of the surface of the object proximate to the feature is convex relative to the camera, and wherein a shape of the detected edge in the image is substantially an ellipse, using the diameter of the circle equal to a major axis of the ellipse and the acquired point angle, calculate the depth value for the feature;

whereby the specific depth of the feature is determined.

2. The apparatus according to claim 1, wherein the feature is a countersink of a hole through a portion of the surface of the object.

3. The apparatus according to claim 1, wherein the one or more processors are further configured to:
  compare the calculated depth value to a predefined range of depth values; and,
  if the calculated depth value is within the predefined range of depth values, assign a first label to the feature; or,
  if the calculated depth value is not within the predefined range of depth values, assign a second label to the feature, the second label being different to the first label.

4. The apparatus according to claim 1, wherein the one or more processors are configured to, using the calculated diameter, the acquired point angle, and one or more trigonometric functions, calculate the depth value for the feature.

5. The apparatus according to claim 1, wherein:
  the apparatus further comprises a lighting system configured to emit electromagnetic radiation;
  the camera is configured to detect the electromagnetic radiation emitted by the lighting system; and
  the lighting system is configured to emit electromagnetic radiation onto the feature and the portion of the surface of the object proximate to the feature, thereby increasing contrast in the image between the feature and the surface of the object.

6. The apparatus according to claim 1, wherein the camera is located on an end effector of a robot arm.

7. The apparatus according to claim 1, wherein
  the apparatus further comprises the cutting tool;
  the camera is further configured to capture one or more images of the object prior to the feature being formed in the object; and
  the one or more processors are further configured to:
    using the one or more images of the object prior to the feature being formed in the object, move the cutting to be normal to the surface of the object; and,
    thereafter, control the cutting tool to form the feature in the surface of the object.

8. A method of determining a specific depth of a feature formed in a surface of an object, the feature having been formed through the surface of the object by a cutting tool, the method comprising:

capturing an image of the feature and a portion of the surface of the object proximate to the feature;

detecting, in the image, an edge of the feature between the feature and the surface of the object;

using the detected edge, calculating a diameter for a circle;

acquiring a point angle of the cutting tool;
  determine whether the portion of the surface of the object proximate to the feature has one of three curvatures selected from:
    a curvature substantially equal to zero,
    a curvature substantially concave relative to the camera, and
    a curvature substantially convex relative to the camera; and, responsive to determining that the portion of the surface of the object proximate to the feature has curvature substantially equal to zero, using the diameter of the best fit circle that best fits to the detected edge, and the acquired point angle, calculate a depth value for the feature responsive to determining that the portion of the surface of the object proximate to the feature is concave relative to the camera, and wherein a shape of the detected edge in the image is substantially an ellipse, using the diameter of the circle equal to a minor axis of the ellipse and the acquired point angle, calculate the depth value for the feature;

responsive to determining that the portion of the surface of the object proximate to the feature is convex relative to the camera, and wherein a shape of the detected edge in the image is substantially an ellipse, using the diameter of the circle equal to a major axis of the ellipse and the acquired point angle, calculate the depth value for the feature;

whereby the specific depth of the feature is determined.

9. An aircraft panel comprising one or more holes, each hole comprising a countersunk portion, each countersunk portion being associated with a depth value, each depth value having been determined using a method according to claim 8.

* * * * *